(12) United States Patent
Asai et al.

(10) Patent No.: US 6,219,268 B1
(45) Date of Patent: Apr. 17, 2001

(54) POWER UNIT

(75) Inventors: Koichi Asai, Nerima-ku; Motohiro Shimizu, Kawagoe; Hiroyuki Eguchi, Machida, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/505,523

(22) Filed: Feb. 17, 2000

(30) Foreign Application Priority Data

Mar. 3, 1999 (JP) .................................. 11-055323

(51) Int. Cl.$^7$ .................................................. H02M 5/257
(52) U.S. Cl. ............................................................. 363/161
(58) Field of Search .................. 363/95, 96, 98, 363/135, 136, 160, 161; 310/26, 153

(56) References Cited

U.S. PATENT DOCUMENTS

| | | | |
|---|---|---|---|
| 3,624,472 | * 11/1971 | Graham | 318/227 |
| 3,889,167 | * 6/1975 | Tanaka et al. | 318/227 |
| 4,570,214 | * 2/1986 | Tanaka | 363/160 |
| 5,285,365 | * 2/1994 | Yamato et al. | 363/8 |
| 5,886,893 | 3/1999 | Asai | 363/161 |

FOREIGN PATENT DOCUMENTS

| | | |
|---|---|---|
| 60-9429 | 3/1985 | (JP) . |
| 10-52045 | 2/1998 | (JP) . |

* cited by examiner

*Primary Examiner*—Matthew Nguyen
(74) *Attorney, Agent, or Firm*—Frishauf, Holtz, Goodman, Langer & Chick, P.C.

(57) ABSTRACT

A power unit is provided which is capable of controlling a rise in voltage applied to each of thyristors constituting a cycloconverter even when the output voltage of the power unit undergoes a temporary sharp rise due to characteristics of a load connected thereto. Positive and negative converters of the cycloconverter are connected to three-phase output windings of a three-phase generator and connected in an antiparallel manner to each other for generating a single-phase alternating current to be supplied via a pair of output lines to the load. A firing angle control device causes the positive and negative converters to be alternately switched to operate every half a repetition period of the single-phase alternating current, to thereby cause the cycloconverter to generate the single-phase alternating current. A bridge rectifier is connected between the pair of output lines. An electric energy-storing capacitor circuit is connected to the output of the bridge rectifier, for storing the rectified output therein.

7 Claims, 6 Drawing Sheets

POWER UNIT

BACKGROUND OF THE INVENTION

1. Field of the Invention

This invention relates to a power unit which generates single-phase AC power having a commercial frequency or a like frequency, and more particularly to a power unit of this kind which uses a cycloconverter comprised of thyristors and which has a small-sized generator having a relatively low output voltage, at an input side thereof, with means for preventing overvoltage from being applied to the thyristors due to characteristics of a load connected to the power unit.

2. Prior Art

Conventionally, a so-called cycloconverter is known, which directly converts AC power with a fixed frequency to AC power with another frequency.

Such a conventional cycloconverter is normally used for converting power supplied from a commercial frequency power line or power generated by a high power generator (see Japanese Patent Publication (Kokoku) No. 60-9429, for instance), and it is generally used for driving an AC electric motor.

Further, when a small-sized generator which generates several hundred to several thousand watts is connected to the output side of such a conventional cycloconverter, a large output voltage drop can occur when a heavy load is connected to the power unit, due to the limited power-generating capacity of the generator. The output voltage drop is particularly large when a magneto generator is employed as the generator. To cope with this, thyristors having a high withstanding voltage have to be used.

To eliminate this inconvenience, the present assignee has already proposed by Japanese Laid-Open Patent Publication (Kokai) No. 10-52045 and corresponding U.S. Pat. No. 5,886,893 a power unit which is comprised of a cycloconverter formed of positive and negative converters each constituted by a two-layered structure of two half-wave converters, and which thereby reduces the voltage applied to each of thyristors of the cycloconverter to a small value.

In the proposed power unit, however, the voltage applied to each thyristor (i.e. the output voltage of the power unit) occasionally undergoes a temporary sharp rise in a peak value thereof which occurs when the power unit is in a transient operating condition, e.g. when a load connected to the power unit is turned on or off, or occurring due to deformation of the output voltage waveform when a reactor load is connected to the power unit, or the like.

To cope with this problem, countermeasures have also to be taken.

SUMMARY OF THE INVENTION

It is an object of the present invention to provide a power unit which is capable of restraining a rise in voltage applied to each of thyristors constituting a cycloconverter of the power unit even when the output voltage of the power unit undergoes a temporary sharp rise due to characteristics of a load connected thereto.

To attain the above object, the present invention provides a power unit comprising:

a generator having three-phase output windings;

a pair of variable control bridge circuits connected to the three-phase output windings of the generator and connected in an antiparallel manner to each other to form a cycloconverter for generating a single-phase alternating current output to be supplied to a load, the cycloconverter having a pair of output lines via which the single-phase alternating current output is delivered;

a bridge drive circuit for causing the variable control bridge circuits to be alternately switched to operate every half a repetition period of the single-phase alternating current output, to thereby cause the cycloconverter to generate the single-phase alternating current output;

a bridge rectifier connected between the pair of output lines, and having an output for delivering rectified output; and an electric energy-storing capacitor circuit connected to the output of the bridge rectifier, for storing the rectified output therein.

According to this power unit, the bridge rectifier and the electronic energy-storing capacitor circuit operate to restrain a sharp rise in the peak value of the single-phase alternating current output, whereby a rise in voltage applied to the variable control bridge circuits can be prevented even when the output voltage of the power unit undergoes a temporary sharp rise due to characteristics of the load connected thereto.

Preferably, the power unit includes monitor means for monitoring a peak value of the single-phase alternating current output, and control means for controlling the variable control bridge circuits such that the operation of the variable control bridge circuits is stopped when the peak value monitored by the monitor means exceeds a predetermined value.

According to this preferred embodiment, while a sharp rise in the peak value of the single-phase alternating current output is prevented by the bridge rectifier and the electronic energy-storing capacitor circuit, the peak value of the single-phase alternating current output is monitored, and when the monitored peak value exceeds the predetermined value, the operation of the variable control bridge circuits is stopped. As a result, a temporary sharp rise in the voltage can be prevented and at the same time overvoltage can be easily detected, thereby enabling the power unit to perform its protective function of stopping the generation of electricity.

Preferably, the three-phase output windings have a neutral point, the output lines of the cycloconverter have a neutral point formed therebetween with respect to the single-phase alternating current output, the variable control bridge circuits each have a two-layered structure of two half-wave converters, and the neutral point formed between the output lines of the cycloconverter being connected to the neutral point of the three-phase output windings such that the variable control bridge circuits operate as a voltage doubler rectifier.

As a result, it is possible to use small-sized thyristors which are not high in withstanding voltage, and even if a sharp temporary rise in voltage occurs due to characteristics of the load, the small-sized thyristors can be used directly as they are.

Preferably, the generator is a magneto generator having a rotor formed of permanent magnets.

Preferably, the electric energy-storing capacitor circuit comprises a capacitor and a resistor.

The above and other objects, features, and advantages of the invention will become more apparent from the following detailed description taken in conjunction with the accompanying drawings.

DETAILED DESCRIPTION

The present invention will now be described in detail with reference to the drawings showing an embodiment thereof.

Figure 1:
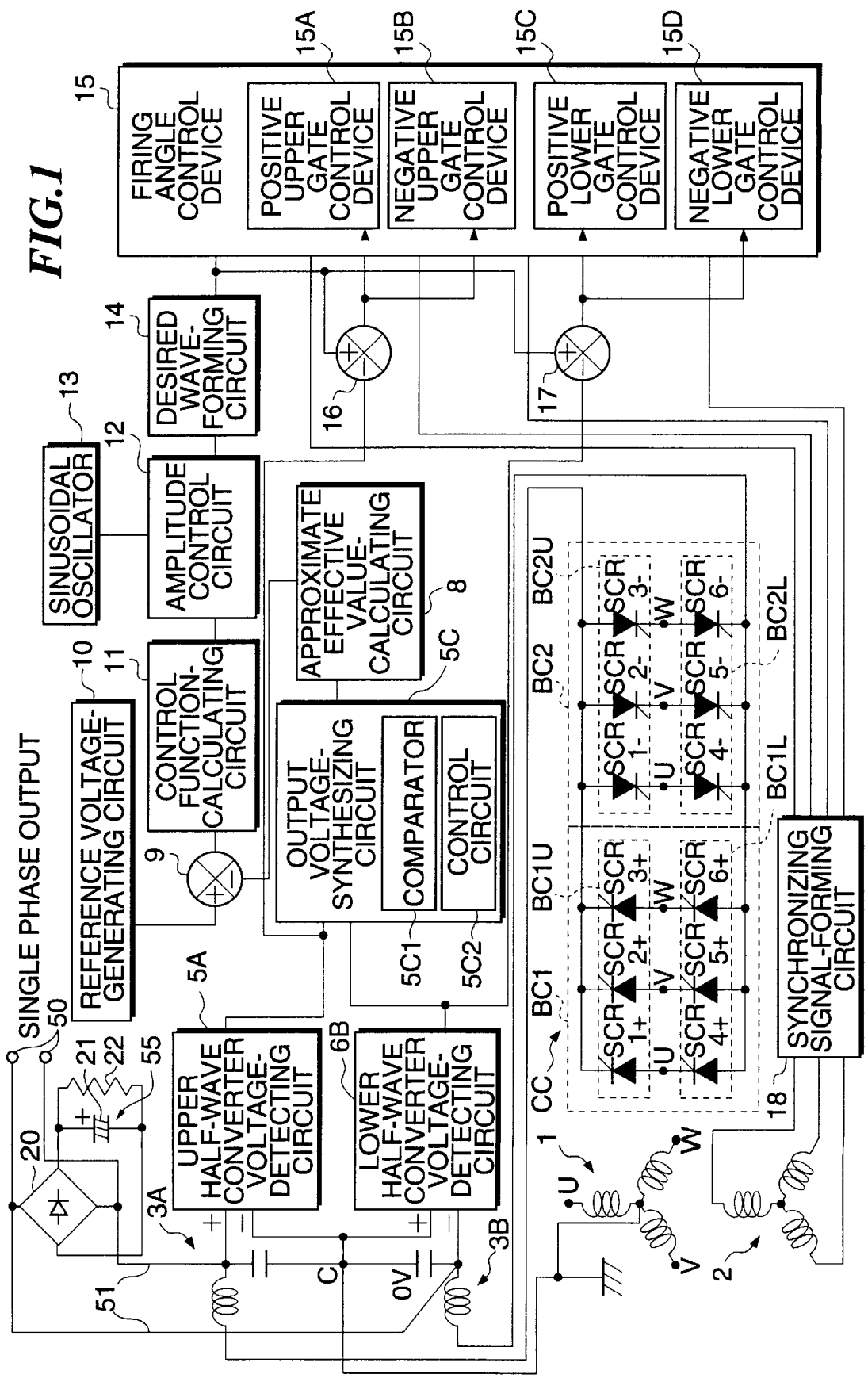
FIG. 1 is a block diagram schematically showing the construction of a power unit according to an embodiment of the invention.

FIG. 1 shows the whole arrangement of a power unit according to an embodiment of the invention.

In FIG. 1, reference numerals 1 and 2 designate output windings independently wound around a stator of an AC generator, i.e. three-phase main output windings (main coils), and three-phase auxiliary output windings (sub coils), respectively.

Figure 2A:
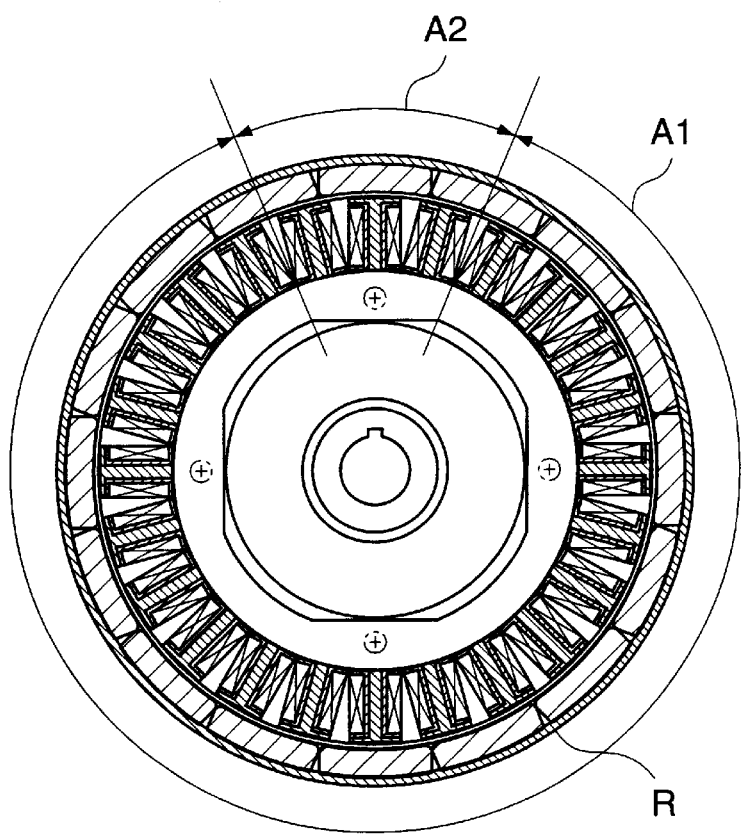
FIG. 2A is a transverse cross-sectional view of an AC generator appearing in FIG. 1.
Figure 2B:
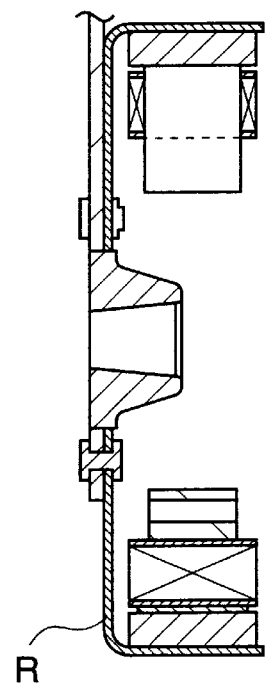
FIG. 2B is a longitudinal cross-sectional view of the AC generator appearing in FIG. 1.

FIGS. 2A and 2B show the construction of the AC generator in longitudinal cross-section and transverse cross-section, respectively. The three-phase main coils 1 are formed by coils forming twenty-one poles within an area A1, and the three-phase sub coils 2 are formed by coils forming three poles within an area A2. A rotor R is formed with eight pairs of magnetic poles of permanent magnets, and driven for rotation by an internal combustion engine, not shown.

Referring again to FIG. 1, the three-phase main coils 1 have three output terminals U, V, and W which are connected to respective input terminals U, V and W of each of positive and negative converters BC1 and BC2. The output side of a cycloconverter CC is connected to an LC filter 3A for removing higher harmonic components from a half-wave rectified electric current delivered from an upper converter layer (half-wave converter) BC1U formed of thyristors SCR1+ to SCR3+ of the positive converter BC1 (hereinafter referred to as "the positive upper converter) or an upper converter layer (half-wave converter) BC2U formed of thyristors SCR1− to SCR3− of the negative converter BC2 (hereinafter referred to as "the negative upper converter), and also connected to an LC filter 3B for removing higher harmonic components from a half-wave rectified electric current delivered from a lower converter layer (half-wave converter) BC1L formed of thyristors SCR4+ to SCR6+ of the positive converter BC1 (hereinafter referred to as "the positive lower converter) or a lower converter layer (half-wave converter) BC2L formed of thyristors SCR4− to SCR6− of the negative converter BC2 (hereinafter referred to as "the negative lower converter). A junction C between the LC filters 3A and 3B is connected to a neutral point of the three-phase main coils 1, and the neutral point serves as ground GND of the present control block.

The output side of the LC filter 3A is connected to an upper half-wave converter voltage-detecting circuit 5A for detecting output voltage of half-wave electric current delivered from the LC filter 3A which is free of higher harmonic components, while the output side of the LC filter 3B is connected to a lower half-wave converter voltage-detecting circuit 5B for detecting output voltage of half-wave electric current delivered from the LC filter 3B which is free of higher harmonic components. A positive input terminal of the upper half-wave converter voltage-detecting circuit 5A and a negative input terminal of the lower half-wave converter voltage-detecting circuit 5B are connected via a pair of output lines 51, 51 respectively to a pair of output terminals 50, 50 from which a single-phase output is obtained.

Thus, in the present embodiment, the junction C, i.e. a neutral point formed on a single-phase output side and the neutral point of the three-phase main coils 1 are connected to each other to establish a voltage doubler rectifier connection. Correspondingly to this connection, the positive and negative converters BC1 and BC2 are constituted by respective two-layered structures of the upper converter layer BC1U and the lower converter layer BC1L, and the upper converter layer BC2U and the lower converter layer BC2L.

Connected between the pair of output lines 51, 51 are the input side of a full-wave bridge rectifier (hereinafter referred to as "the bridge rectifier") 20 comprised of four diodes. The bridge rectifier 20 has an output side thereof connected to an electric energy-storing capacitor circuit 55 comprised of a capacitor (e.g. electrolytic capacitor) 21 and a resistor 22.

The voltage-detecting circuits 5A and 5B have respective output sides thereof connected to an output voltage-synthesizing circuit 5C which synthesizes the voltages detected by the voltage-detecting circuits 5A and 5B. The output voltage-synthesizing circuit 5C has an output side thereof connected to an approximate effective value-calculating circuit 8 which calculates an approximate effective value of the output voltage-synthesizing circuit 5C. The circuit 8 in turn has an output side thereof connected to a negative input terminal of a comparator 9. Connected to a positive input terminal of the comparator 9 is a reference voltage-generating circuit 10 for generating a reference voltage value for the power unit. The comparator 9 has an output side thereof connected to a control function-calculating circuit 11 which calculates a control function, such as a linear function, based on results of the comparison by the comparator 9.

The control function-calculating circuit 11 has an output side thereof connected to an amplitude control circuit 12 which controls the amplitude of a sinusoidal wave having a commercial frequency of 50 Hz or 60 Hz, for example, delivered from a sinusoidal oscillator 13 connected thereto. That is, the amplitude control circuit 12 generates an amplitude control signal for controlling the amplitude of the sinusoidal wave delivered from the sinusoidal oscillator 13, based on the control function delivered from the control function-calculating circuit 11.

Within the output voltage-syntheisizing circuit 5C, there are provided a comparator 5C1 for comparing the peak value of the synthesized output voltage with a predetermined value (upper limit value which will not allow the voltage applied to each of the thryistors SCRk ± constituting the cycloconverter CC to exceed a withstand voltage thereof (which may include some marginal value)), and a control circuit 5C2 which stops the operation of the cycloconveter (inhibits firing of the gates thereof) when it is determined from the comparison that the peak value is equal to or higher than the predetermined value.

The amplitude control circuit 12 has an output side thereof connected to a desired wave-forming circuit 14 which generates a desired wave (sinusoidal wave adjusted in amplitude) in response to the amplitude control signal from the circuit 12. The desired wave-forming circuit 14 has an output side thereof connected to a firing angle control device 15 for controlling the firing angle of a gate of each of the thyristors SCRk± constituting the cycloconverter CC, as well as to a positive input terminal of each of comparators 16 and 17.

The firing angle control device 15 is comprised of a positive upper gate control device 15A for controlling the firing angles of the gates of the thyristors SCR1+ to SCR3+ of the positive upper converter BC1U (hereinafter referred to as "the positive upper gates"), a negative upper gate control device 15B for controlling the firing angles of the gates of the thyristors SCR1− to SCR3− of the negative upper converter BC2U (hereinafter referred to as "the negative upper gates"), a positive lower gate control device 15C for controlling the firing angles of the gates of the thyristors SCR4+ to SCR6+ of the positive lower converter BC1L (hereinafter referred to as "the positive lower gates"), and a negative lower gate control device 15D for controlling the firing angles of the gates of the thyristors SCR4− to SCR6− of the negative lower converter BC2L (hereinafter referred to as "the negative lower gates").

These gate control devices 15A to 15D each have three comparators, not shown, each of which compares the desired wave from the desired wave-forming circuit 14 with a synchronizing signal (reference sawtooth wave), referred to hereinafter, and fires a corresponding one of the gates when the former agrees with the latter.

The comparator 16 has a negative input terminal thereof connected to the output side of the upper half-wave converter voltage-detecting circuit 5A, while the comparator 17 has a negative input terminal thereof connected to the output side of the lower half-wave converter voltage-detecting circuit 5B. The output side of the comparator 16 is connected to the positive upper gate control device 15A and the negative upper gate control device 15B, while the output side of the comparator 17 is connected to the positive lower gate control device 15C and the negative lower gate control device 15D. The comparator 16 compares the voltage from the upper half-wave converter voltage-detecting circuit 5A with the desired wave, and selectively generates a high (H) level signal or a low (L) level signal depending upon results of the comparison. Similarly, the comparator 17 compares the voltage from the lower half-wave converter voltage-detecting circuit 5B with the desired wave, and selectively generates a high (H) level signal or a low (L) level signal depending upon results of the comparison.

When the H level signal is delivered from the comparator 16, the positive upper gate control device 15A is enabled, while the negative upper gate control device 15B is disabled. On the other hand, when the L level signal is delivered from the same, the positive upper gate control device 15A is disabled, while the negative upper gate control 15B is enabled. Similarly, when the H level signal is delivered from the comparator 17, the positive lower gate control device 15C is enabled, while the negative lower layer gate control device 15D is disabled. On the other hand, when the L level signal is delivered from the same, the positive lower layer gate control device 15C is disabled, while the negative lower layer gate control device 15D is enabled.

Figure 3:
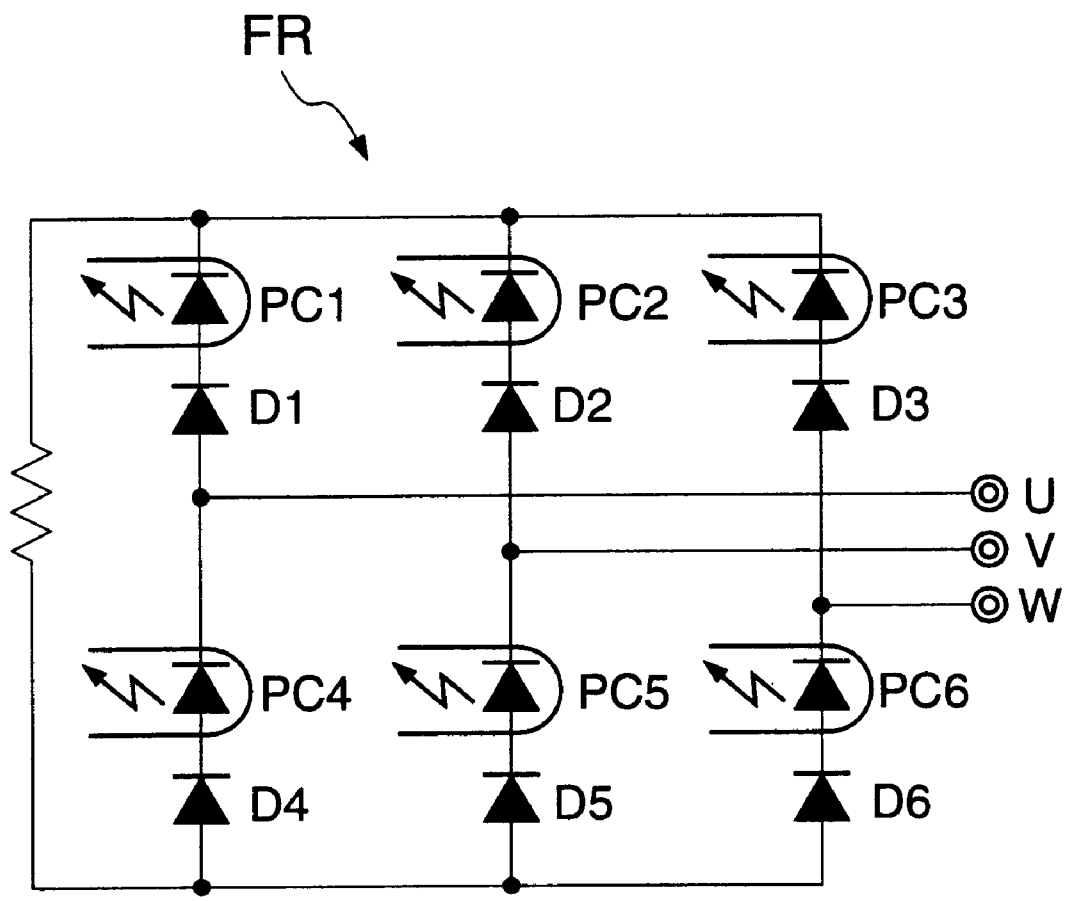
FIG. 3 is a circuit diagram showing the construction of a three-phase full-wave bridge rectifier.

The output terminals of the three-phase sub coils 2 are connected to a synchronizing signal-forming circuit 18 which may be formed of a three-phase full-wave rectifier FR shown in FIG. 3. The synchronizing signal-forming circuit 18 forms and delivers sawtooth waves as shown in FIGS. 4A to 5B in response to the three-phase outputs from the three-phase sub coils 2.

Figure 4A:
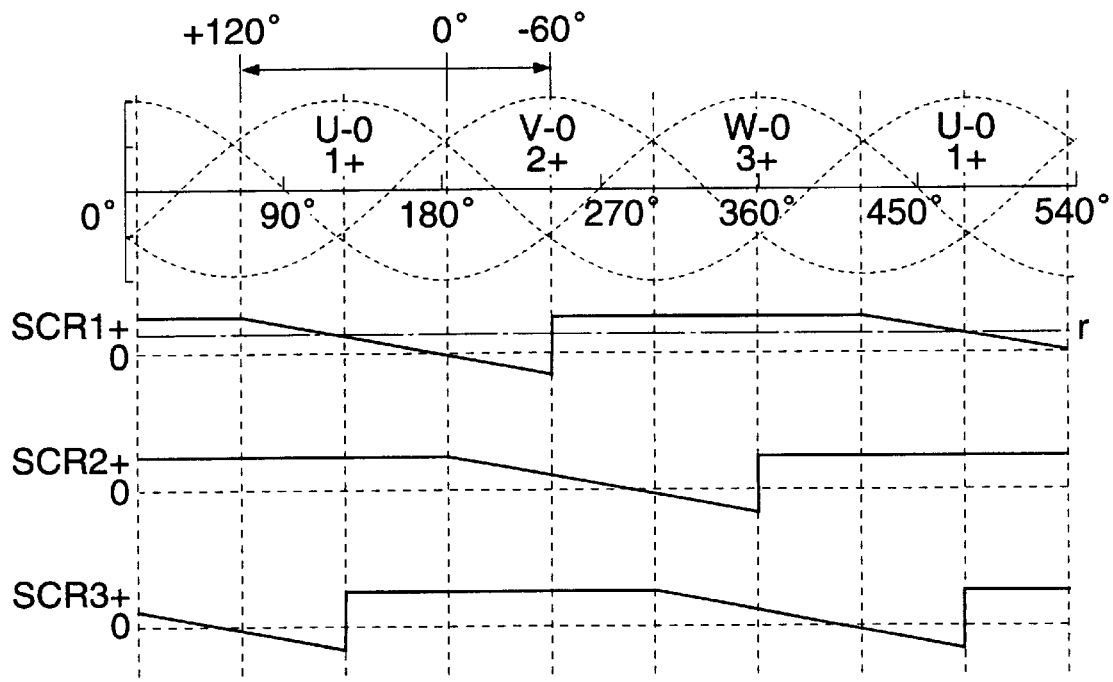
FIG. 4A is a diagram showing examples of reference sawtooth waves generated for controlling the firing angles of thyristors SCRk+ of a positive upper converter appearing in FIG. 1.
Figure 4B:
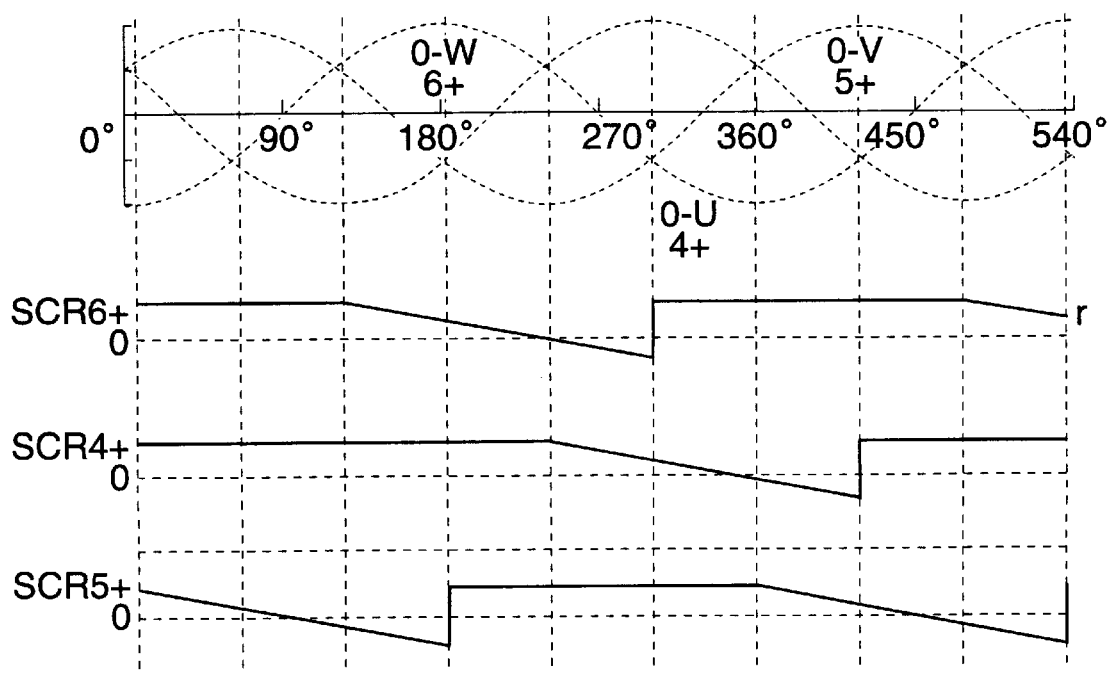
FIG. 4B is a diagram showing examples of reference sawtooth waves generated for controlling the firing angles of thyristors SCRk+ of a positive lower converter appearing in FIG. 1.

FIGS. 4A and 4B show examples of sawtooth waves for controlling the firing angles of the thyristors SCRk+ of the positive converter BC1. FIG. 4A shows sawtooth waves for controlling the firing angles of the thyristors SCR1+ to SCR3+ of the positive upper converter BC1U, while FIG. 4B shows sawtooth waves for controlling the firing angles of the thyristors SCR4+ to SCR6+ of the positive lower converter BC1L.

Figure 5A:
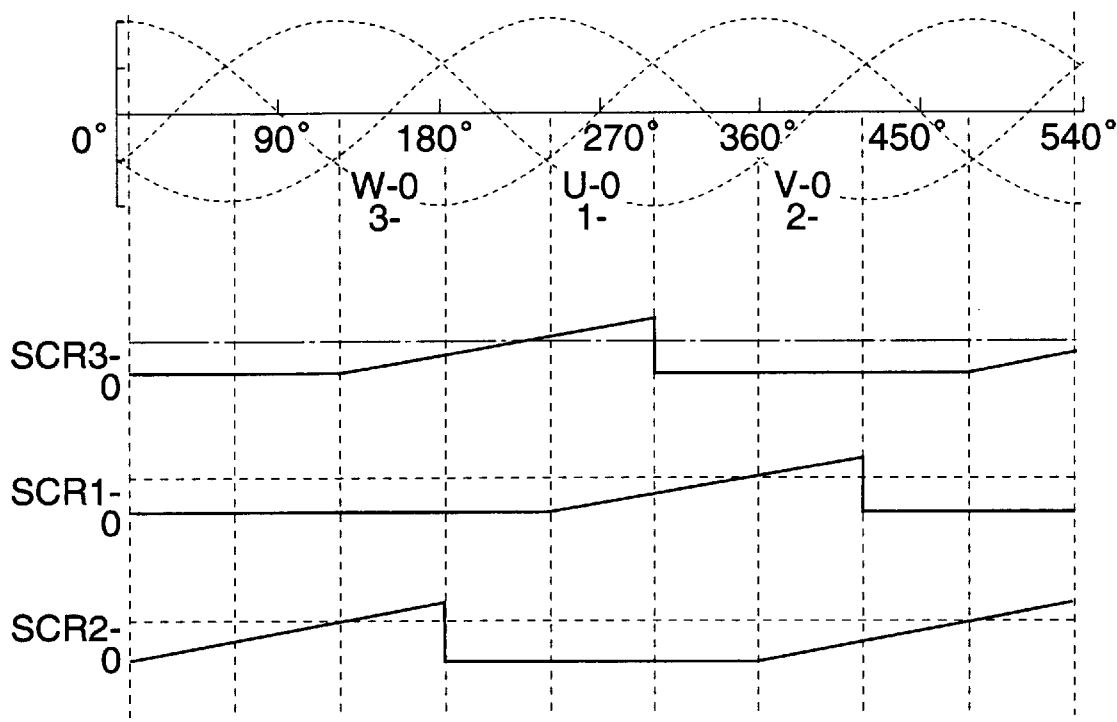
FIG. 5A is a diagram showing examples of reference sawtooth waves generated for controlling the firing angles of thyristors SCRk− of a negative upper converter appearing in FIG. 1.
Figure 5B:
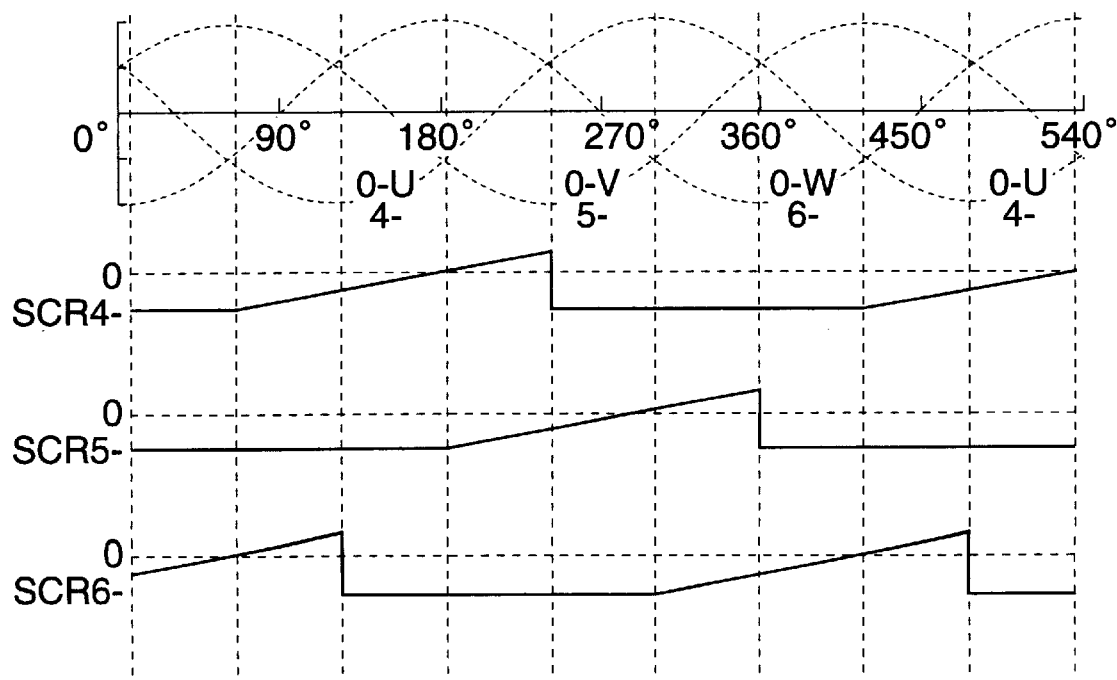
FIG. 5B is a diagram showing examples of reference sawtooth waves generated for controlling the firing angles of thyristors SCRk− of a negative lower converter appearing in FIG. 1.

On the other hand, FIGS. 5A and 5B show examples of sawtooth waves for controlling the firing angles of the thyristors SCRk− of the negative converter BC2. FIG. 5A shows sawtooth waves for controlling the firing angles of the thyristors SCR1− to SCR3− of the negative upper converter BC2U, while FIG. 5B shows sawtooth waves for controlling the firing angles of the thyristors SCR4− to SCR6− of the negative lower converter BC2L.

The output side of the synchronizing signal-forming circuit 18 is connected to the positive upper gate control device 15A, the negative upper gate control device 15B, the positive lower gate control device 15C and the negative lower gate control device 15D. Connection lines between the synchronizing signal-forming circuit 18 and the gate control devices 15A to 15D are each formed by three signal lines ends of which are connected to respective corresponding ones of the comparators of the gate control devices 15A to 15D for supplying them with respective three sawtooth waves having extended sawtooth portions described above with reference to FIGS. 4A to 5B. That is, the three sawtooth waves having extended sawtooth portions as shown in each of FIGS. 4A and 4B are supplied to respective corresponding ones of the comparators of the positive upper gate control device 15A and the positive lower gate control device 15C in timing shown in each of FIGS. 4A and 4B, while the three sawtooth waves having extended sawtooth portions as shown in each of FIGS. 5A and 5B are supplied to respective corresponding ones of the comparators of the negative upper gate control device 15B and the negative lower gate control device 15D in timing shown in each of FIGS. 15A and 15B.

The output sides of the three comparators of the positive upper control device 15A are connected to the gates of respective corresponding ones of the thyristors SCR1+ to SCR3+ of the positive upper converter BC1U, the output sides of the three comparators of the negative upper control device 15B to the gates of respective corresponding ones of the thyristors SCR1− to SCR3− of the negative upper converter BC2U, the output sides of the three comparators of the positive lower control device 15C to respective corresponding ones of the gates of the thyristors SCR4+ to SCR6+ of the positive lower converter BC1L, and the output sides of the three comparators of the negative lower control device 15D to respective corresponding ones of the gates of the thyristors SCR4− to SCR6− of the negative lower converter BC2.

Although in the present embodiment, the synchronizing signal-forming circuit 18 is constructed such that it forms synchronizing signals (reference sawtooth waves) in response to three-phase outputs from the three-phase sub coils 2, this is not limitative, but a single-phase sub coil may be employed in place of the three-phase sub coils 2 to form a synchronizing signal (reference sawtooth wave) in response to the single-phase output.

Next, the operation of the power unit constructed as above will be described.

As the rotor R is driven for rotation by the engine, voltages are produced between the three-phase output terminals of the three-phase main coils 1 as described above. Then, as the gate of each of the thyristors SCRk± is fired by the firing angle control device 15, the cycloconverter CC delivers two half-wave rectified currents which are obtained by connecting the neutral point of the three-phase main coils 1 to the ground GND, and the filters 3A and 3B remove harmonic components from the two half-wave rectified currents. The upper and lower half-wave converter voltage-detecting circuits 5A and 5B detect the voltages of the half-wave rectified electric currents, which are added together by the output voltage-synthesizing circuit 5C. The approximate effective value-calculating circuit 8 calculates the approximate effective value of the cycloconverter output voltage based on the voltage thus synthesized, and generates a signal indicative of the calculated approximate effective value.

The comparator 9 compares the approximate effective value with the reference voltage value delivered from the reference voltage-generating circuit 10, and the control function-calculating circuit 11 calculates the control function (linear function) based on results of the comparison. Based on the control function thus calculated, the amplitude control circuit 12 controls the amplitude of the sinusoidal wave of 50 Hz or 60 Hz delivered from the sinusoidal oscillator 13, to generate a control signal, and the desired wave-forming circuit 14 generates the desired wave (sinusoidal wave) based on the control signal. That is, the amplitude of the desired wave is adjusted to a value not largely different from the amplitude of the sawtooth waves delivered from the synchronizing signal-forming circuit 18.

The comparator 16 compares the desired wave from the desired wave-forming circuit 14 with the output voltage detected by the upper layer half-wave converter voltage-detecting circuit 5A, and when the former is higher in voltage than the latter, a high (H) level signal is delivered from the comparator 16 to the positive upper gate control device 15A to enable the same, whereas when the former is lower in voltage than the latter, a low (L) level signal is delivered from the comparator 16 to the negative upper gate control device 15B to enable the same. Similarly, the comparator 17 compares the desired wave with the output voltage detected by the lower half-wave converter voltage-detecting circuit 5B, and when the former is higher in voltage than the latter, a high (H) level signal is delivered from the comparator 17 to the positive lower gate control device 15C to enable the same, whereas when the former is lower in voltage than the latter, a low (L) level signal is delivered from the comparator 17 to the negative lower gate control device 15D to enable the same.

The comparators of the selected one of the positive upper gate control device 15A and the negative upper gate control device 15B and those of the selected one of the positive lower gate control device 15C and the negative lower gate control device 15D each compare the desired wave from the desired wave-forming circuit 14 with respective sawtooth waves from the synchronizing signal-forming circuit 18. When the desired wave agrees with the sawtooth wave, a one-shot pulse having a predetermined wavelength is delivered from the gate control device 15 to the gate of a corresponding one of the thyristor SCRk± to thereby control the firing angle thereof.

Figure 6A:
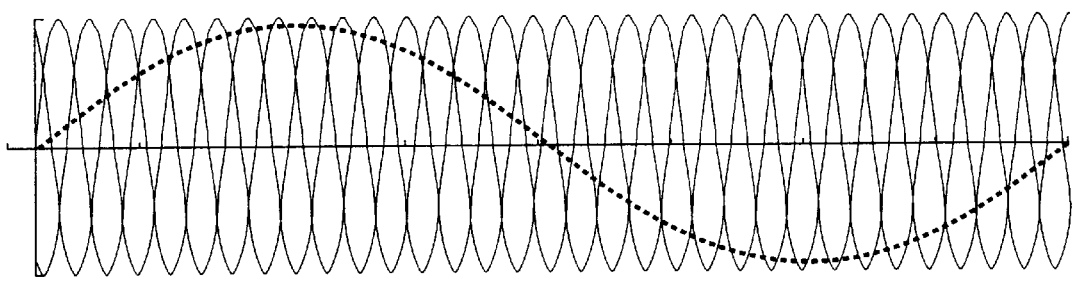
FIG. 6A is a diagram showing an example of output voltage waveform of upper (half-wave) converters of the FIG. 1 power unit.
Figure 6B:
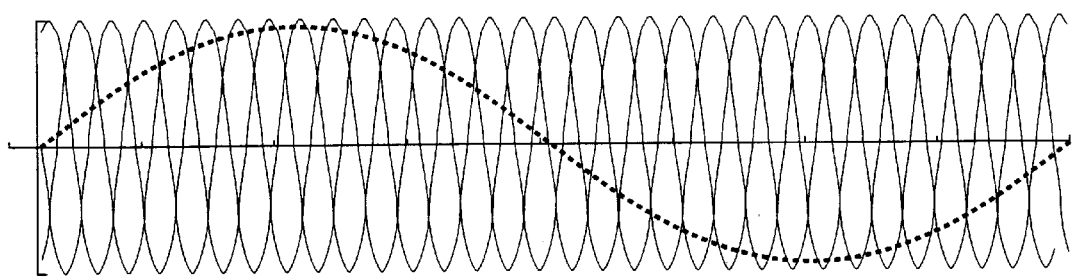
FIG. 6B is a diagram showing an example of output voltage waveform of lower (half-wave) converters of the FIG. 1 power unit.
Figure 6C:
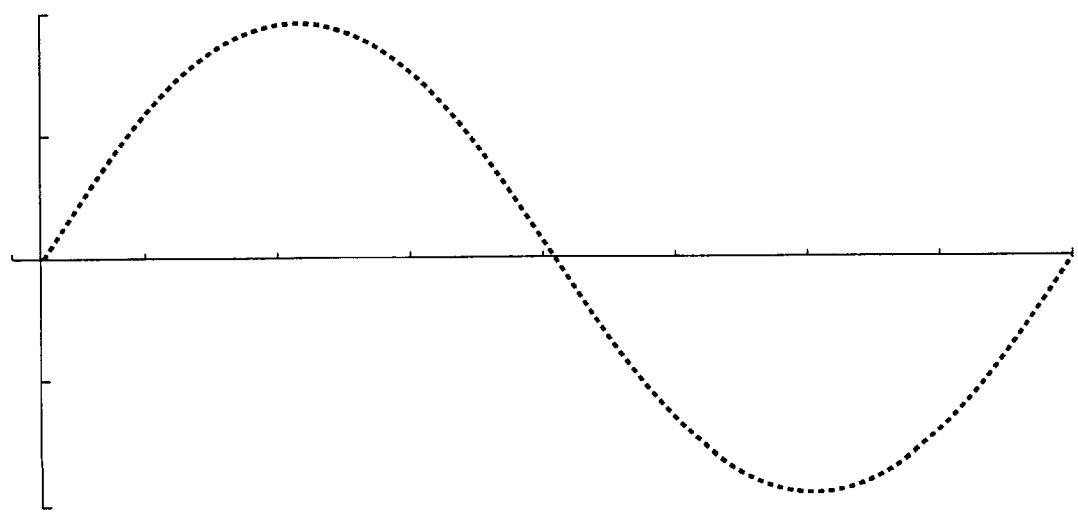
FIG. 6C is a diagram showing a synthesized output voltage waveform of the upper and lower (half-wave) converters of the FIG. 1 power unit.

FIGS. 6A to 6C show examples of output waveforms generated by the power unit of the present embodiment. FIG. 6A shows an output waveform formed by the upper (half-wave) converters BC1U and BC2U, and FIG. 6B shows an output waveform formed by the lower (half-wave) converters BC1L and BC2L, while FIG. 6C shows an output waveform formed by synthesizing the FIGS. 6A and 6B waveforms, i.e. a waveform of the output voltage of the power unit of the present embodiment.

Thus, according to the present embodiment, the upper (half-wave) converters BC1U and BC2U form a waveform having half the amplitude of the FIG. 6C single-phase output waveform, while the lower (half-wave) converters BC1L and BC2L form a waveform having half the amplitude of the FIG. 6C single-phase output waveform. These waveforms are synthesized i.e. added together, and supplied to the load as the single-phase output. The manner of forming the FIG. 6A waveform and the FIG. 6B waveform is the same as described in U.S. Pat. No. 5,886,893, assigned to the present assignee, which is incorporated herein by reference, with reference to FIGS. 1 to 6 thereof, and hence description thereof is omitted.

As described above, according to the present embodiment, the neutral point formed on the single-phase output side and the neutral point of the three-phase main coils 1 are connected to each other to establish the voltage doubler rectifier connection, and the positive and negative converters BC1 and BC2 are constituted by respective two-layered structures of the positive upper converter BC1U and the positive lower converter BC1L, and the negative upper converter BC2U and the negative lower converter BC2L. Therefore, even if a small output power generator which generates several hundreds to several thousands watts is connected to the input side of the cycloconverter, the voltage applied to the thyristors SCRk± can be restrained to a low value even when the line-to line voltage rises under a no-load condition of the power unit. This permits the use of small-sized thyristors having lower withstanding voltages.

The peak value of the single-phase output (i.e. output voltage of the power unit) occasionally undergoes a temporary sharp rise occurring when the power unit is in a transient operating condition, e.g. when a load connected to the power unit is turned on or off, or occurring due to deformation of the output voltage waveform when a reactor load is connected to the power unit, or the like. Such a rise in the peak value of the single-phase output is absorbed via the bridge rectifier 20 by the capacitor 21. That is, the rise in the peak value of the single-phase output is first eliminated by the above-mentioned circuits 20 and 55, and then applied to the thyristors SCRk± constituting the cycloconverter CC. Therefore, even if the peak value of the single-phase output ungergoes a temporary sharp rise, the influence of the rise in voltage on the thyristors SCRk ± becomes substantially negligible. This permits small-sized thyristors which are not high in withstanding voltage to be employed directly without any modification as the thyristors SCRk± constituting the cycloconverter CC.

As described heretofore, according to the present embodiment, since the bridge rectifier 20 is connected between the output lines 51 and 51, and the electric energy-storing capacitor circuit 55 formed of the capacitor 21 and the resistor 22 is connected to the output side of the bridge rectifier 20, it is possible to prevent the voltage applied to the thyristors SCRk± from rising even when the peak value of the single-phase output undergoes a temporary sharp rise due to characteristics of a load connected to the power unit.

Further, in addition to the above case of a temporary sharp rise in the peak value of the single-phase output, there can be a case where the peak value of the single-phase output progressively rises due to some cause such that it exceeds the withstand voltage of the thyristors SCRk± . In such a case, the comparator 5C1 of the output voltage-synthesizing circuit 5C determines that the peak value is equal to or higher than the predetermined value, and then the control circuit 5C2 stops the operation of the cycloconverter CC.

The operation of the cycloconverter CC can be resumed by first stopping the engine once to cause the generated output voltage to drop to zero volts, and then starting the engine again to take out the generated output to thereby make the peak value lower than the predetermined value. If the condition of the peak value ≧ the predetermined value cannot be canceled (e.g. because an excessive load condition is not removed), the starting and stopping of the cycloconverter will be repeatedly carried out.

Thus, according to the present embodiment, a sharp rise in the peak value of the single-phase alternating current output is prevented by the bridge rectifier 20 and the electric energy-storing capacitor circuit 55 formed of the capacitor 21 and the resistor 22, and further the peak value of the single-phase output is monitored and when it becomes equal to or higher than the predetermined value, the operation of the cycloconverter CC is stopped. As a result, a temporary sharp rise in the voltage can be prevented and at the same time overvoltage can be easily detected, thereby enabling the power unit to fully perform its protective function of stopping the generation of electricity.

What is claimed is:

1. A power unit comprising:
   a generator having three-phase output windings;
   a pair of variable control bridge circuits connected to said three-phase output windings of said generator and connected in an antiparallel manner to each other to form a cycloconverter for generating a single-phase alternating current output to be supplied to a load, said cycloconverter having a pair of output lines via which said single phase alternating current output is delivered;
   a bridge drive circuit that causes said variable control bridge circuits to be alternately switched to operate every half a repetition period of said single-phase alternating current output, to thereby cause said cycloconverter to generate said single-phase alternating current output;
   a bridge rectifier connected between said pair of output lines of said cycloconverter, and having an output for outputting rectified output; and
   an electric energy-storing capacitor circuit that is connected to said output of said bridge rectifier and that absorbs a temporary rise of said rectified output therein.

2. A power unit according to claim 1, further comprising:
   monitor means for monitoring a peak value of said single-phase alternating current output, and
   control means for controlling said variable control bridge circuits such that operation of said variable control bridge circuits is stopped when said peak value monitored by said monitor means exceeds a predetermined value.

3. A power unit according to claim 1, wherein:
   said three-phase output windings have a neutral point,
   said output lines of said cycloconverter have a neutral point formed therebetween with respect to said single-phase alternating current output,
   said variable control bridge circuits each have a two-layered structure of two half-wave converters, and
   said neutral point formed between said output lines of said cycloconverter is connected to said neutral point of said three-phase output windings such that said variable control bridge circuits operate as a voltage doubler rectifier.

4. A power unit according to claim 2, wherein:
   said three-phase output windings have a neutral point,
   said output lines of said cycloconverter have a neutral point formed therebetween with respect to said single-phase alternating current output,
   said variable control bridge circuits each have a two-layered structure of two half-wave converters, and
   said neutral point formed between said output lines of said cycloconverter is connected to said neutral point of said three-phase output windings such that said variable control bridge circuits operate as a voltage doubler rectifier.

5. A power unit according to claim 1, wherein said generator comprises a magneto generator having a rotor formed of permanent magnets.

6. A power unit according to claim 4, wherein said generator comprises a magneto generator having a rotor formed of permanent magnets.

7. A power unit according to claim 1, wherein said electric energy-storing capacitor circuit comprises a capacitor and a resistor.

* * * * *